United States Patent
Faulhaber et al.

(10) Patent No.: US 12,210,190 B2
(45) Date of Patent: Jan. 28, 2025

(54) OPTICAL FIBER WITH A TAPERED CORE

(71) Applicant: Lumentum Operations LLC, San Jose, CA (US)

(72) Inventors: Richard D. Faulhaber, San Carlos, CA (US); Martin H. Muendel, Oakland, CA (US); Patrick Gregg, Sunnyvale, CA (US); James J. Morehead, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/447,373

(22) Filed: Sep. 10, 2021

(65) Prior Publication Data

US 2023/0008662 A1    Jan. 12, 2023

Related U.S. Application Data

(60) Provisional application No. 63/203,127, filed on Jul. 9, 2021.

(51) Int. Cl.
*G02B 6/255* (2006.01)
*G02B 6/02* (2006.01)
*G02B 6/245* (2006.01)

(52) U.S. Cl.
CPC ......... *G02B 6/255* (2013.01); *G02B 6/02042* (2013.01); *G02B 6/245* (2013.01)

(58) Field of Classification Search
None
See application file for complete search history.

(56) References Cited

U.S. PATENT DOCUMENTS

| | | | | |
|---|---|---|---|---|
| 3,830,667 A * | 8/1974 | Carpenter | ............... | C03B 37/15 385/115 |
| 4,763,976 A * | 8/1988 | Nolan | .................. | G02B 6/4202 385/127 |
| 4,795,228 A * | 1/1989 | Schneider | ............ | G02B 6/4206 385/33 |
| 6,330,382 B1 * | 12/2001 | Harshbarger | .......... | G02B 6/262 385/27 |
| 7,209,615 B2 * | 4/2007 | Fishteyn | ................ | G02B 6/255 385/115 |
| 8,818,151 B1 * | 8/2014 | Ward | ................ | H01S 3/094053 385/115 |
| 2001/0022879 A1 * | 9/2001 | Wu | ....................... | G02B 6/2551 385/27 |
| 2004/0165620 A1 * | 8/2004 | Rogers | .................... | H01S 3/067 372/6 |

(Continued)

OTHER PUBLICATIONS

Love et al., "Tapered single-mode fibres and devices Part 1 : Adiabaticity criteria," IEE Proceedings-I, vol. 138, No. 5, Oct. 1991, 12 Pages.

*Primary Examiner* — Chris H Chu
(74) *Attorney, Agent, or Firm* — Harrity & Harrity, LLP

(57) ABSTRACT

In some implementations, an optical fiber may include a core and a cladding surrounding the core. The core and the cladding may provide light guidance along the optical fiber in a light propagation direction. The core may have a taper in the light propagation direction in a section of the optical fiber. A diameter of the core may decrease independently of a diameter of the cladding in the section of the optical fiber.

18 Claims, 4 Drawing Sheets

(56) References Cited

U.S. PATENT DOCUMENTS

| | | | |
|---|---|---|---|
| 2004/0165827 A1* | 8/2004 | Bruesselbach | G02B 6/04 |
| | | | 385/46 |
| 2005/0265653 A1* | 12/2005 | Cai | G02B 6/2552 |
| | | | 385/28 |
| 2006/0045444 A1* | 3/2006 | Miller | C03C 25/1061 |
| | | | 385/115 |
| 2010/0247047 A1* | 9/2010 | Filippov | C03B 37/02763 |
| | | | 385/127 |
| 2011/0002585 A1* | 1/2011 | Gibson | G02B 6/2856 |
| | | | 65/412 |
| 2016/0161674 A1* | 6/2016 | Tanaka | H01S 5/4012 |
| | | | 385/24 |
| 2017/0242204 A1* | 8/2017 | Collier | G02B 6/305 |
| 2018/0224607 A1* | 8/2018 | Bookbinder | C03C 13/046 |

\* cited by examiner

OPTICAL FIBER WITH A TAPERED CORE

CROSS-REFERENCE TO RELATED APPLICATION

This Patent Application claims priority to U.S. Provisional Patent Application No. 63/203,127, filed on Jul. 9, 2021, and entitled "OPTICAL FIBER FOR A SIGNAL COMBINER." The disclosure of the prior Application is considered part of and is incorporated by reference into this Patent Application.

TECHNICAL FIELD

The present disclosure relates generally to an optical fiber combiner and to an optical fiber with a tapered core.

BACKGROUND

In an optical system, beam quality generally refers to a measure of how tightly a laser beam can be focused under certain conditions (e.g., with a limited beam divergence). For example, a high beam quality implies smooth wavefronts (e.g., a strong phase correlation across the beam profile) such that focusing the beam with a lens enables the beam to be focused where the wavefronts are planar. On the other hand, a beam with poor beam quality may have scrambled wavefronts that make beam focusing more difficult (e.g., the beam divergence for a given spot size is increased). One metric that is often used to quantify beam quality is beam parameter product (BPP), which is defined as the product of the beam radius (measured at the beam waist) and the beam divergence half-angle (measured in the far field). In general, beam quality decreases as the BPP value increases and vice versa (e.g., a higher BPP is associated with a lower beam quality and a lower BPP is associated with a high beam quality). In general, the minimum achievable BPP value is $\lambda/\pi$, which corresponds to an ideal Gaussian beam with a wavelength $\lambda$. For example, the minimum possible BPP value for a beam that has a 1064 nanometer (nm) wavelength is about 0.339 millimeters times milliradians (mm-mrad). The BPP remains unchanged or may increase minimally (e.g., does not become significantly worse) when a beam is sent through non-aberrative optics, such as a thin lens (e.g., if the lens generates a focus with a smaller radius or a larger radius at the beam waist, the beam divergence will increase or decrease correspondingly). However, non-ideal optics can lead to a significant increase in the BPP value, which can spoil the beam quality. For example, the BPP value can significantly increase in cases where one or more optical components cause the beam radius to increase without a corresponding decrease in the beam divergence half-angle.

SUMMARY

In some implementations, an optical fiber combiner includes an enclosing tube and at least one optical fiber bundled within the enclosing tube. The at least one optical fiber may include a core, and a cladding surrounding the core, the core and the cladding providing light guidance along the at least one optical fiber in a light propagation direction. The core may have a pre-formed taper in the light propagation direction in a section of the at least one optical fiber, and a diameter of the core may decrease independently of a diameter of the cladding in the section of the at least one optical fiber.

In some implementations, an optical fiber includes a core, and a cladding surrounding the core, the core and the cladding providing light guidance along the optical fiber in a light propagation direction. The core may have a non-drawn taper in the light propagation direction in a section of the optical fiber, and a diameter of the core may decrease independently of a diameter of the cladding in the section of the optical fiber.

In some implementations, a method may include obtaining an optical fiber including a core and a cladding surrounding the core, the core and the cladding providing light guidance along the optical fiber in a light propagation direction. The method may include forming the core, in a section of the optical fiber, to have a taper in the light propagation direction, where a diameter of the core decreases independently of a diameter of the cladding in the section of the optical fiber.

DETAILED DESCRIPTION

The following detailed description of example implementations refers to the accompanying drawings. The same reference numbers in different drawings may identify the same or similar elements.

Various laser architectures allow a high-power laser source to be operated with a high beam quality (e.g., a high radiance or brightness). However, existing laser architectures have limitations, and some laser applications would require a higher laser power and/or brightness than appears to be feasible with any known laser technology. Another problem that arises in laser applications that require a high laser power is that high-power laser systems are developed and built in small numbers, making the devices costly. One potential solution to address the challenges and/or limitations in high-power laser systems is to use beam combining, which refers to an optical system in which the outputs from multiple laser sources (e.g., in a laser array) are combined to obtain a single output beam. Accordingly, using a scalable beam-combining technology can lead to a power-scalable laser source, even if the single lasers are not scalable.

Figure 1A:
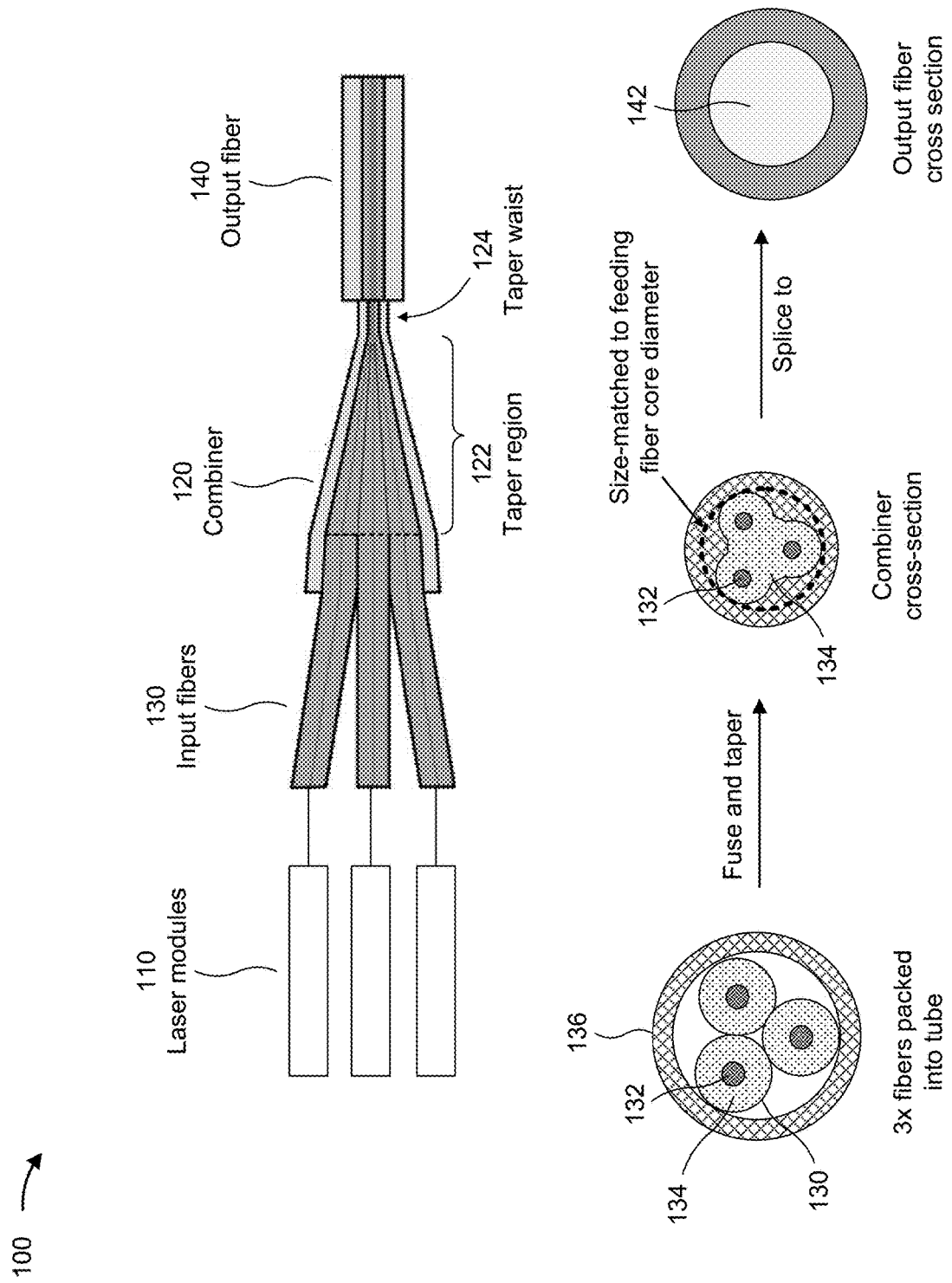
FIGS. 1A-1B are diagrams illustrating one or more examples of beam combining.
Figure 1B:
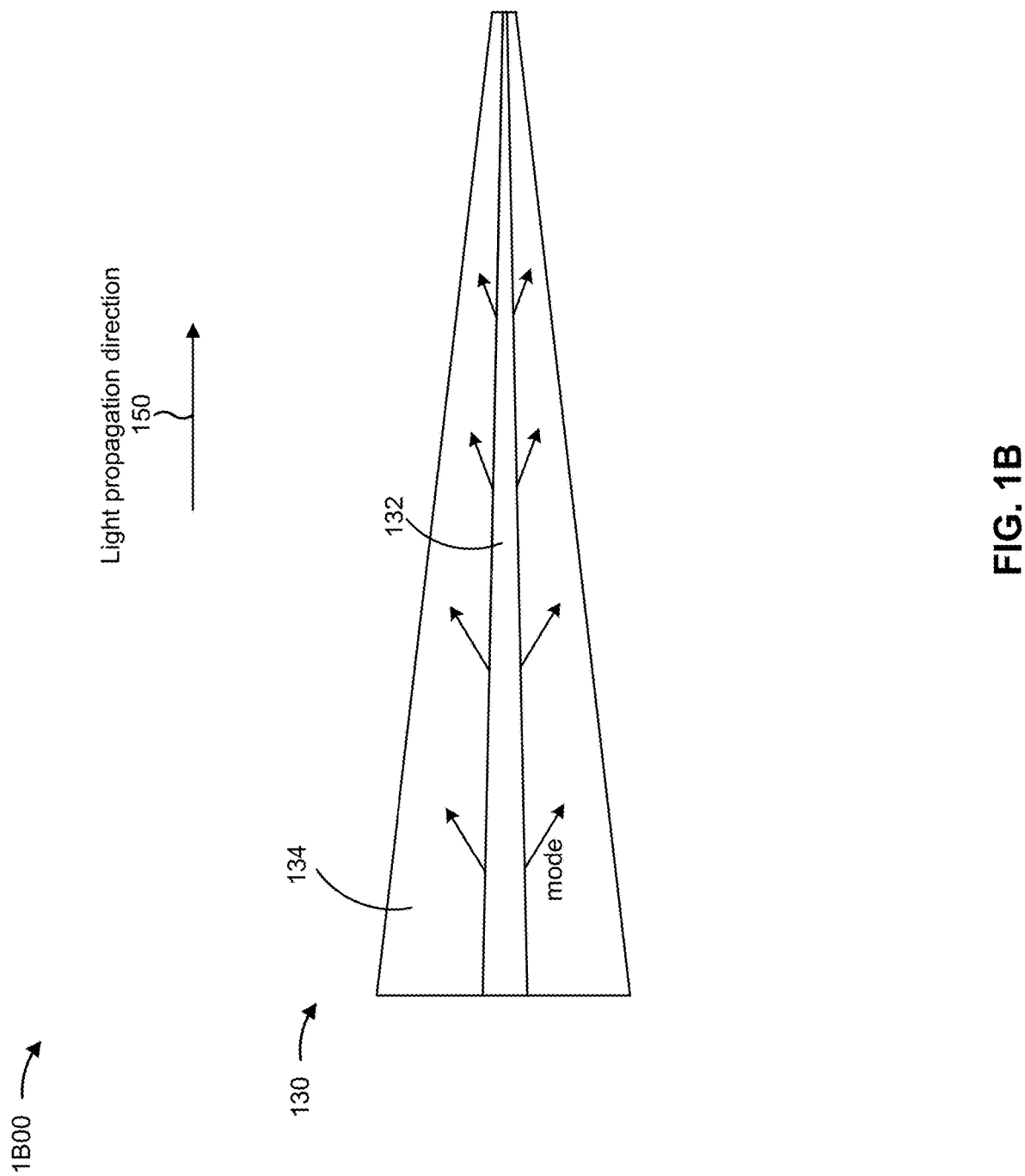

FIGS. 1A-1B are diagrams illustrating one or more examples 100 of beam combining, which can be used to scale power in multi-kilowatt (kW) fiber lasers. As shown in FIG. 1A, a laser module and combiner approach may be used to configure one or more laser modules 110 to achieve a maximum power, and multiple laser modules 110 may then be combined via an optical fiber combiner 120 (e.g., a signal combiner) to achieve a greater total system power. A common strategy used in the laser module and combiner approach is to fuse several input fibers 130 into a bundle, pack the bundle into an enclosing tube (e.g., a glass tube, a capillary tube, or the like), and collapse the tube onto the input fibers 130. The input fibers 130 may be etched and/or tapered over a taper region 122 to achieve a target initial diameter (e.g., until the combined claddings of the input fibers 130 are size-matched to an output fiber 140). The input fibers 130 that are fused in the bundle may then be cleaved at a taper waist 124 (e.g., a location where a diameter of the combiner 120 is at a minimum), and the bundled input fibers 130 may then be spliced to the output fiber 140.

For example, as shown in FIG. 1A, the illustrated combiner 120 is a 3:1 combiner in which three input fibers 130 are packed as a bundle into a glass tube or another suitable enclosing tube 136. Each input fiber 130 includes a circular core 132 and a circular cladding 134 surrounding the circular core 132. The assembly may then be fused and tapered, which causes light to leak from the cores 132 into the respective claddings 134. Accordingly, a fused cladding 134 is illuminated by light leaving the laser modules 110. As further shown in FIG. 1A, the fused and tapered assembly is size-matched in diameter to a core 142 of the output fiber 140. The combiner bundle and the output fiber 140 are then spliced, completing the optical fiber combiner 120.

In an optical assembly or optical system that uses beam combining, one design goal is to multiply the output power, but another important design objective is to preserve beam quality such that radiance is increased nearly as much as the output power. Accordingly, in an optical system that uses the laser module and combiner approach shown in FIG. 1A, a typical objective is to combine the laser modules 110 such that a beam parameter product (BPP) increases as little as possible and no power is lost. For example, as described above, BPP generally refers to the product of a beam radius and a beam divergence angle. The BPP is similar or analogous to entropy, in that beams with a lower BPP are preferred for most material processing applications. Furthermore, BPP is typically easy to increase and difficult or impossible to decrease.

In an optical system where N laser modules 110 are combined, a theoretically perfect combiner 120 will increase the output BPP as $\sqrt{N}$ times the BPP of the individual input laser modules 110. Qualitatively, the BPP increase occurs because the total beam area increases N times while the divergence angle is maintained, and BPP scales as the square root of area.

Scaling the power of a single laser module using a master oscillator power amplifier (MOPA) may require the use of input fibers 130 having cores 132 with large diameters in order to avoid nonlinear effects, such as Stimulated Raman Scattering (SRS). Input fibers 130 having large cores 132 may support a large number of modes, making combining challenging relative to single-mode sources or few-moded sources. Thus, the combiner 120, as described above, that uses input fibers 130 having cores 132 with large diameters may result in increased BPP degradation.

As described above, as the fiber bundle is heated and tapered, diameters of the cores 132 of the input fibers 130 shrink and fiber modes that were supported by the original-sized cores 132 are no longer supported by the reduced-sized cores 132. This continues until all or nearly all light is guided, not in the cores 132, but in the claddings 134 of the input fibers 130, confined either by the air surrounding the fiber bundle or a low-refractive-index doped glass (e.g., fluorine (F)-doped glass) incorporated into the enclosing tube 136. A taper of the combiner 120 can be considered adiabatic if each starting mode guided by a core 132, that transitions from the core 132 to a cladding 134, transitions into a single cladding mode of the same mode order, or equivalently, a single cladding mode with the same BPP, as the starting mode.

FIG. 1B shows an example of an input fiber 130 used in the combiner 120 of FIG. 1A. The input fiber 130 may have a taper in a light propagation direction 150. For example, the core 132 of the input fiber 130 may taper in a light propagation direction 150. That is, a diameter of the core 132 of the input fiber 130 may decrease in the light propagation direction 150. Continuing with the example, the cladding 134 of the input fiber 130 may taper in the light propagation direction 150. That is, a diameter of the cladding 134 of the input fiber 130 may decrease in the light propagation direction 150.

A geometry of the taper of the input fiber 130 may be defined by a taper length, a taper ratio (i.e., the ratio of an initial diameter to a final diameter), and/or a clad-to-core diameter ratio (CCDR). To enable adiabatic tapers, CCDR should be kept to a minimum, and typically is uniform along the taper. For example, as a mode is ejected from the tapering core 132, the mode is more likely to adiabatically transition to a single cladding mode if the CCDR is relatively low. However, if the CCDR is relatively high, the mode being ejected can experience significant power coupling to higher order cladding modes that are nearly phase-matched to the mode ejected from the core 132. This results in increased BPP due to higher order mode content generated in the taper, as adiabaticity is more constraining for higher order modes, thereby requiring smaller CCDR or longer tapers relative to lower order modes. Thus, input beams associated with relatively higher BPPs require relatively lower CCDRs (e.g., for a given taper ratio and taper length) to achieve an adiabatic taper.

Taper length and taper ratio together define the rate of change of the diameter of the core 132. Generally, a taper is more adiabatic when the rate of change of the diameter of the core 132 is relatively small. Equivalently, a taper is more adiabatic when the taper angle Ω, shown in Equation 1 below, is relatively small.

$$\Omega = \frac{\text{Initial core radius} - \text{Final core radius}}{\text{taper length}} = \frac{1}{2}\frac{\Delta(\text{core diameter})}{\Delta z} \quad \text{Equation 1}$$

As described above, taper length, taper ratio, and CCDR are determinative of whether a taper is adiabatic. Moreover, taper length, taper ratio, and CCDR can be leveraged against one another. For example, a large CCDR can be mitigated by a long taper. Typically, design constraints (e.g., laser enclosure size, form factor, or the like) provide a limitation on taper length. Additionally, taper ratio plays a role in determining a fraction of the modes that are ejected from the core into the cladding. For a highly multimoded step index fiber, the approximate number of guided modes N is provided by Equation 2:

$$N \approx \frac{V^2}{2} \quad \text{Equation 2}$$

where V, referred to as a fiber's V-number, is provided by Equation 3:

$$V = \frac{\pi D}{\lambda}NA \quad \text{Equation 3}$$

where D is the core diameter, λ is the wavelength of light, and NA relates to the index contrast between core and cladding.

Each fiber mode has a particular cutoff V-number, below which the mode will not be confined (for instance, single mode waveguides have V-numbers below 2.4, because this is the cutoff V-number for LP11, the next lowest-order mode). Thus, if the combiner 120 or the taper of the input fiber 130 is to eject all or some number of modes from the core 132 at the end of the taper, then the final diameter of the core 132 is fixed. Thus, as the size of the core 132 increases for power-scaling, as described above, achieving particular final core sizes requires larger taper ratios.

Moreover, as described above, bundled input fibers 130 are spliced to the output fiber 140, which may have a relatively large diameter core 142 to account for SRS. Thus, to preserve brightness, the bundled input fibers 130 should fill the core 142 of the output fiber 140 as much as possible. Because the cores 132 of the bundled input fibers 130 are shrunk significantly to eject modes, the CCDR at the taper waist 124 should be large enough to fill the output fiber 140, which frustrates CCDR minimization, as described above. In addition, in a case where increasing the input power requires increasing (e.g., doubling) the input core size, maintaining a taper ratio and a diameter of the cladding 134 may result in a final core 132 that is relatively large and will retain more light within the core 132 at the taper waist 124, thereby degrading BPP. Furthermore, increasing the taper ratio to avoid increasing the final core size while keeping the same diameter of the cladding 134 results in underfilling the output fiber 140, thereby degrading BPP. Thus, to achieve both the desired final core diameter and to fill a particular target diameter of the output fiber 140 requires increasing the CCDR, which may result in a non-adiabatic taper.

Some implementations described herein relate to an optical fiber in which CCDR is disentangled from taper ratio and/or taper length. In particular, a taper of the core of the optical fiber may be independent of a diameter of the cladding of the optical fiber. This enables, for example, a relatively large CCDR at an end of the taper (e.g., which may be desirable for filling the core of an output fiber) and a relatively small CCDR at a start of the taper (e.g., which may be desirable to prevent BPP degradation, as higher order modes may leave the core closer to the start of the taper). In some implementations, the taper of the optical fiber may be pre-formed (e.g., prior to bundling of the optical fiber for a combiner). For example, a section of the optical fiber may be machined to produce a cladding diameter that increases from a first end of the section to a second end of the section (e.g., coinciding with an end of the optical fiber). Continuing with the example, the machined optical fiber may be tapered to produce a taper of the core, whereby CCDR is decoupled from taper ratio. The pre-tapered optical fiber may be bundled with one or more additional pre-tapered fibers and packed into an enclosing tube of an optical fiber combiner.

In this way, an optical fiber may be fabricated such at that CCDR and taper ratio are independent parameters. This improves taper adiabaticity, which may be necessary in very high-power applications that use large core diameter fibers or in applications where short taper lengths may be desired. Furthermore, a combiner using optical fibers with pre-formed tapers may produce high-quality beams (e.g., with low BPP) associated with high brightness and high power.

As indicated above, FIGS. 1A-1B are provided as an example. Other examples may differ from what is described with regard to FIGS. 1A-1B.

Figure 2:
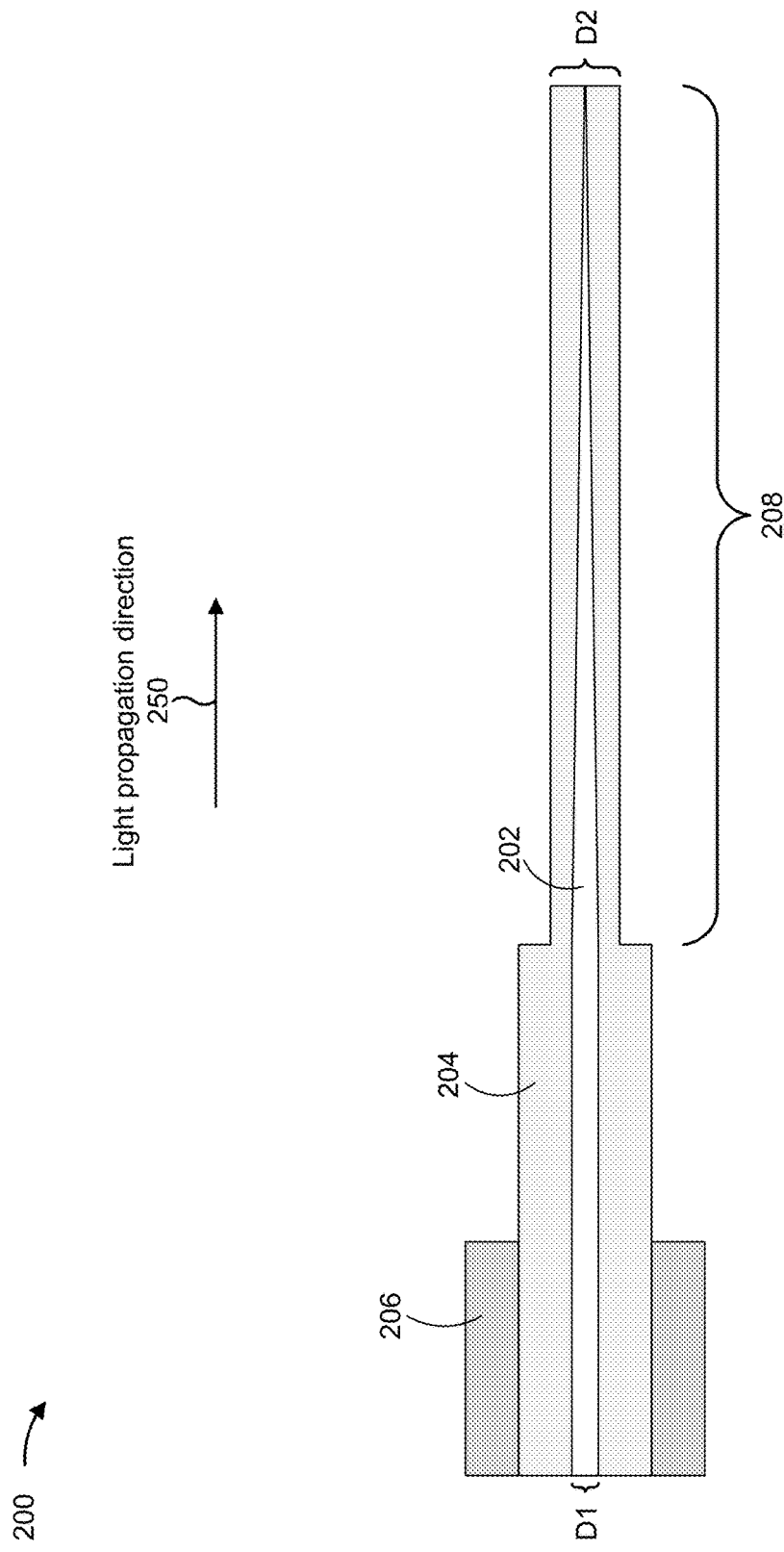
FIG. 2 is a diagram of an example optical fiber.

FIG. 2 is a diagram of an example optical fiber 200. The optical fiber 200 includes a core 202 and a cladding 204 surrounding the core 202. In addition, the optical fiber 200 may include a buffer 206 (e.g., a coating layer) that surrounds the cladding 204. The core 202 may include a glass, or a similar material, with a first refractive index. The cladding 204 may include a glass, or a similar material, with a second refractive index. The buffer 206 may include a polymer material.

The core 202 and the cladding 204 may provide light guidance along the optical fiber in a light propagation direction 250. As shown in FIG. 2, the core 202 may be associated with a diameter D1 and the cladding 204 may be associated with a diameter D2. The diameter D1 of the core 202 and/or the diameter D2 of the cladding 204 may have variations in the light propagation direction 250, as described below.

As shown in FIG. 2, the core 202 may have a taper, in the light propagation direction 250, in a section 208 of the optical fiber 200. In some implementations, the section 208 has a length that is less than 500 millimeters (mm), less than 250 mm, or less than 100 mm. The taper may be a pre-formed taper, as described in connection with FIG. 3. Moreover, the taper may be adiabatic.

In connection with the taper, the diameter D1 of the core 202 may decrease in the light propagation direction 250 from a first end of the section 208 to a second end of the section 208 (e.g., the second end may coincide with an end of the optical fiber 200). In some implementations, in the section 208, the diameter D1 of the core 202 may decrease independently of the diameter D2 of the cladding 204. That is, in the section 208, the diameter D1 of the core 202 and the diameter D2 of the cladding 204 may be independent of each other. In other words, in the section 208, a rate of change of the diameter D1 of the core 202 and a rate of change of the diameter D2 of the cladding 204 are not equivalent.

In some implementations, in the section 208, a ratio of the diameter D2 of the cladding 204 to the diameter D1 of the core 202 (i.e., a CCDR) may be independent of a taper ratio of the core 202. For example, in the section 208, the diameter D2 of the cladding 204 may be constant, while the diameter D1 of the core 202 may decrease. That is, in the section 208, the core 202 may have the taper and the cladding 204 may be non-tapered. As another example, in the section 208, the diameter D1 of the core 202 may decrease at a first rate, while the diameter D2 of the cladding 204 may decrease at a second rate and/or may increase. As a further example, in the section 208, the diameter D1 of the core 202 may change (e.g., decrease) at a constant rate, while the diameter D2 of the cladding 204 may change (e.g., decrease and/or increase) at a non-constant rate (e.g., a surface of the cladding 204 may be rippled and/or may extend in at least two different angles relative to a central axis of the optical fiber 200).

In some implementations, a first ratio of the diameter D2 of the cladding 204 to the diameter D1 of the core (i.e., a first CCDR) in the section 208 is different from a second ratio of the diameter D2 of the cladding 204 to the diameter D1 of the core 202 (i.e., a second CCDR) in the section 208. In particular, a first ratio of the diameter D2 of the cladding 204 to the diameter D1 of the core (i.e., a first CCDR) at the first end of the section 208 may be different from a second ratio of the diameter D2 of the cladding 204 to the diameter D1 of the core 202 (i.e., a second CCDR) at the second end of the section 208 (e.g., the second end follows the first end in the light propagation direction 250). The second ratio at the second end of the section 208 may be larger than the first ratio at the first end of the section 208. In this way, a larger CCDR at an end of the taper may be useful for filling the core of an output fiber, and a smaller CCDR at a start of the taper may reduce BPP degradation.

In some implementations, an optical fiber combiner may include an enclosing tube (e.g., a glass tube, a capillary tube, or the like) and at least one optical fiber 200 bundled within the enclosing tube, in a similar manner as described in connection with FIG. 1A. The at least one optical fiber 200 may have a pre-formed taper, as described herein. In some implementations, the optical fiber combiner may include multiple optical fibers 200 (e.g., having cores with pre-formed tapers, as described herein) bundled within the enclosing tube. The enclosing tube of the optical fiber combiner may taper from an input end of the enclosing tube to an output end of the enclosing tube. An optical system or optical assembly may include the optical fiber combiner arranged between multiple laser modules and an output fiber (e.g., for power scaling to multi-kW levels), as described in connection with FIG. 1A. In some implementations, a fiber optic coupler, an evanescent field sensor, or another device in which independent control of CCDR and taper ratio is useful, may include one or more optical fibers 200 (e.g., with pre-formed tapers). Multiple optical fibers 200 that are used together may have the same or different core diameters, cladding diameters, CCDRs, or the like.

As indicated above, FIG. 2 is provided as an example. Other examples may differ from what is described with regard to FIG. 2.

Figure 3:
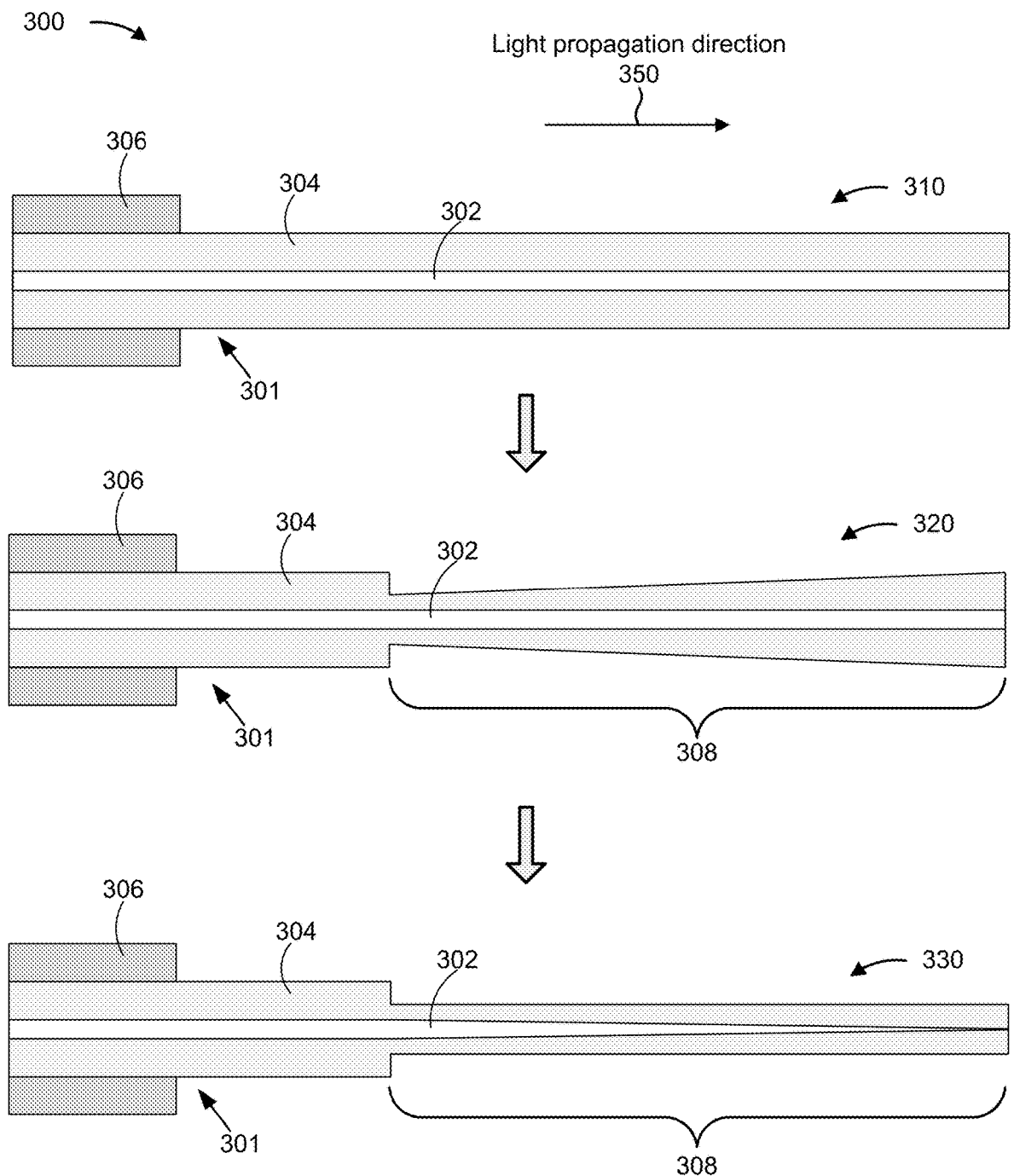
FIG. 3 is a diagram of an example process 300 relating to fabricating an optical fiber with a tapered core.

FIG. 3 is a diagram of an example process 300 relating to fabricating an optical fiber with a tapered core. Process 300 may be performed (e.g., autonomously) by one or more machines.

As shown by reference number 310, process 300 may include obtaining an optical fiber 301 that includes a core 302 and a cladding 304 surrounding the core 302, as described above. The core 302 and the cladding 304 may provide light guidance along the optical fiber 301 in a light propagation direction 350, as described above. The optical fiber 301 may include a buffer 306 that surrounds the cladding, as described above. The optical fiber 301 may be a fully fabricated optical fiber (e.g., as opposed to a fiber preform) in which the core 302 is to be tapered.

Process 300 may include forming the core 302, in a section 308 of the optical fiber 301, to have a taper in the light propagation direction 350, for example, as shown by reference numbers 320 and 330. That is, the core 302 may be formed to have the taper such that a diameter of the core 302 decreases independently of a diameter of the cladding 304 in the section 308 of the optical fiber 301, as described above.

As shown by reference number 320, process 300 may include removing material from the cladding 304 in the section 308. The material may be removed from the cladding 304 by machining the optical fiber 301. For example, the optical fiber 301 may be machined using a CO2 fiber laser. In some implementations, the material may be removed from the cladding 304 such that the diameter of the cladding 304 increases and/or decreases in the section 308, changes (e.g., decreases or increases) at a constant rate, and/or changes (e.g., decreases and/or increases) at a non-constant rate (e.g., according to a desired CCDR).

As shown in FIG. 3, the material may be removed from the cladding 304 such that the diameter of the cladding 304 increases (e.g., at a constate rate) from a first end of the section 308 to a second end of the section 308 (e.g., the second end, which may coincide with an end of the optical fiber 301, follows the first end in the light propagation direction 350). For example, the diameter of the cladding 304 at the first end of the section 308 may be less than the diameter of the cladding 304 in a different section of the optical fiber from which material is not removed, and the diameter of the cladding 304 at the second end of the section 308 may be the same as the diameter of the cladding 304 in the different section. In other words, the material may be removed from the cladding 304 such that the cladding 304 has a taper opposite to the light propagation direction 350.

In some implementations, the section 308 of the optical fiber 301 may include a separate optical fiber (e.g., that includes a core and a cladding) that is spliced to the optical fiber 301. For example, material may be removed from the cladding of the separate optical fiber, in a similar manner as described above. Here, the material may be removed from the cladding of the separate optical fiber by etching. After the material is removed from the cladding of the separate optical fiber (e.g., to produce the section 308 shown in connection with reference number 320), the separate optical fiber may be spliced to an optical fiber precursor (e.g., the portion excluding the section 308 shown in connection with reference number 320) to obtain the optical fiber 301 (e.g., the optical fiber 301 shown by reference number 320).

As shown by reference number 330, process 300 may include tapering the optical fiber 301 (e.g., pre-tapering the optical fiber 301 before combining with another optical fiber), in the section 308 in which the material of the cladding 304 is removed, to form the core 302 having the taper. For example, the optical fiber 301 may be tapered in the section 308 using flame tapering or another fiber optic tapering technique. The diameter of the core 302 having the taper may decrease from the first end of the section 308 to the second end of the section 308. Moreover, the optical fiber 301 may be tapered such that the diameter of the cladding 304 is constant in the section 308, as described above. However, in some implementations, the optical fiber 301 may be tapered such that the diameter of the cladding 304 increases and/or decreases in the section 308, as described above. In this way, in the section 308, a ratio of the diameter of the cladding 304 to the diameter of the core 302 (i.e., a CCDR) is independent of a taper ratio of the core 302.

In some implementations, process 300 may include forming the core 302 to have the taper using a reverse order of operations than described above. For example, the optical fiber 301, shown by reference number 310, may be tapered (e.g., pre-tapering the optical fiber 301 before combining with another optical fiber), in the section 308, to form the core 302 having the taper. This would result in the cladding 304 also having a taper. Continuing with the example, material then may be removed from the cladding 304 in the section 308 that is tapered. The material may be removed from the cladding 304 by machining, as described above. In some examples, the material may be removed from the cladding 304 such that the diameter of the cladding 304 is constant in the section 308, as described above. However, in some implementations, the material may be removed from the cladding 304 such that the diameter of the cladding 304 increases and/or decreases in the section 308, as described above. In this way, in the section 308, a ratio of the diameter of the cladding 304 to the diameter of the core 302 (i.e., a CCDR) is independent of a taper ratio of the core 302.

Process 300, described above, may be used to produce the optical fiber 200. In other words, optical fiber 301, with the core 302 formed to have the taper, may correspond to optical fiber 200.

Using process 300, the core 302 of the optical fiber 301 may have a pre-formed taper (e.g., a taper that is individually fabricated for the optical fiber 301). For example, the pre-formed taper may be formed prior to subsequent bundling of the optical fiber within an enclosing tube. Moreover, the pre-formed taper may be fabricated, as described above, on a fully fabricated optical fiber. In other words, the taper is not formed during forming (e.g., drawing) of a fiber preform into an optical fiber (e.g., which may result in a taper length longer than 500 mm, such as greater than 1 meter). Thus, the taper of the core 302 of the optical fiber 301 may be a non-drawn taper (e.g., which may enable a shorter taper length, improved adiabaticity, improved CCDR control per change in taper length, improved form factor for incorporation into an optical assembly, or the like). As used herein, a non-drawn taper may refer to a taper that is formed by a fabrication process on an optical fiber after the optical fiber has been drawn on a draw tower or a similar apparatus.

In some implementations, process 300 may include bundling the optical fiber 301 (e.g., having the tapered core 302 that is formed as described above) and at least one additional optical fiber (e.g., which also may have a tapered core that is formed as described above) within an enclosing tube, as described above. For example, bundling the optical fiber 301 and the at least one additional optical fiber may include fusing the optical fiber 301 and the at least one additional optical fiber. In some implementations, process 300 may include tapering (e.g., using flame tapering) the enclosing tube onto the bundle of the optical fiber 301 and the at least one additional optical fiber (e.g., to complete an optical fiber combiner). This may result in additional tapering of the optical fiber 301. However, in contrast to previous techniques (e.g., in which tapering of the enclosing tube may produce a taper of an optical fiber for which CCDR is dependent on a taper ratio), the core 302 of the optical fiber 301 (e.g., in the section 308) has a pre-formed taper (e.g., to achieve one or more desired CCDRs) prior to packing in the enclosing tube and tapering of the enclosing tube to complete the combiner. That is, the core 302 of the optical fiber 301 may have an independently pre-formed taper relative to the at least one additional optical fiber (e.g., in contrast to tapers of the optical fiber 301 and the at least one additional optical fiber being first formed during the same tapering event on the enclosing tube). In this way, the pre-formed taper of the optical fiber 301 enables independence of CCDR and a taper ratio of the core 302 (e.g., even after subsequent tapering of an enclosing tube that contains the optical fiber 301).

Although FIG. 3 shows, and is described by, example operations of process 300, in some implementations, process 300 may include additional operations, fewer operations, different operations, or differently arranged operations than those depicted in, and described in connection with, FIG. 3. Additionally, or alternatively, two or more of the operations of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical fiber combiner, comprising:
   an enclosing tube; and
   a plurality of optical fibers bundled within the enclosing tube, wherein at least one optical fiber of the plurality of optical fibers comprises:
   a core; and
   a cladding surrounding the core, the core and the cladding providing light guidance along the at least one optical fiber in a light propagation direction,
      wherein the core has a pre-formed taper in the light propagation direction in a section of the at least one optical fiber,
      wherein a diameter of the core decreases independently of a diameter of the cladding in the section of the at least one optical fiber,
      wherein the diameter of the core decreases at a constant rate in the section of the at least one optical fiber,
      wherein the diameter of the cladding changes at a non-constant rate in the section of the at least one optical fiber,
      wherein the at least one optical fiber, at a taper waist of the optical fiber combiner, is spliced to an output fiber to enable core light from the at least one optical fiber to enter the output fiber,
      wherein a ratio of the diameter of the cladding of the at least one optical fiber to the diameter of the core is independent of a taper ratio of the core in the section of the at least one optical fiber,
      wherein at least one other optical fiber of the plurality of optical fibers has another core diameter that is different from the core diameter, and
      wherein, at the taper waist, a diameter of a combined cladding of the plurality of optical fibers is size-matched to a core diameter of an output core of the output fiber.

2. The optical fiber combiner of claim 1, wherein a first ratio of the diameter of the cladding to the diameter of the core at a first end of the section of the at least one optical fiber is different from a second ratio of the diameter of the cladding to the diameter of the core at a second end of the section of the at least one optical fiber.

3. The optical fiber combiner of claim 2, wherein the second end follows the first end in the light propagation direction, and
wherein the second ratio is larger than the first ratio.

4. The optical fiber combiner of claim 1, wherein the enclosing tube tapers from an input end of the enclosing tube to an output end of the enclosing tube.

5. The optical fiber combiner of claim 1, wherein the plurality of optical fibers have cores with independently pre-formed tapers.

6. The optical fiber combiner of claim 1, wherein a first ratio of the diameter of the cladding of the at least one optical fiber to the diameter of the core, at an input end of the at least one optical fiber, is less than a second ratio of the diameter of the cladding of the at least one optical fiber to the diameter of the core, at an output end of the at least one optical fiber.

7. An optical fiber, comprising:
a core; and
a cladding surrounding the core, the core and the cladding providing light guidance along the optical fiber in a light propagation direction,
wherein the core has a non-drawn taper in the light propagation direction in a section of the optical fiber,
wherein a diameter of the core decreases independently of a diameter of the cladding in the section of the optical fiber,
wherein the diameter of the core decreases at a constant rate in the section of the optical fiber,
wherein the diameter of the cladding changes at a non-constant rate in the section of the optical fiber,
wherein the optical fiber, at an output end of the optical fiber, is spliced to an output fiber to enable core light from the optical fiber to enter the output fiber,
wherein a ratio of the diameter of the cladding to the diameter of the core is independent of a taper ratio of the core in the section of the optical fiber,
wherein, at the output end of the optical fiber, the optical fiber is combined with at least one other optical fiber to produce a combined cladding having a diameter that is size-matched to a core diameter of an output core of the output fiber, and
wherein the at least one other optical fiber has another core diameter that is different from the core diameter.

8. The optical fiber of claim 7, wherein a length of the section of the optical fiber is less than 500 millimeters.

9. The optical fiber of claim 7, wherein the non-drawn taper is adiabatic.

10. The optical fiber of claim 7, wherein a first ratio of the diameter of the cladding to the diameter of the core, at an input end of the optical fiber, is less than a second ratio of the diameter of the cladding to the diameter of the core, at the output end.

11. A method, comprising:
obtaining an optical fiber comprising a core and a cladding surrounding the core, the core and the cladding providing light guidance along the optical fiber in a light propagation direction;
forming the core, in a section of the optical fiber, to have a taper in the light propagation direction,
wherein a diameter of the core decreases independently of a diameter of the cladding in the section of the optical fiber,
wherein the diameter of the core decreases at a constant rate in the section of the optical fiber,
wherein the diameter of the cladding changes at a non-constant rate in the section of the optical fiber, and
wherein a ratio of the diameter of the cladding to the diameter of the core is independent of a taper ratio of the core in the section of the optical fiber;
bundling the optical fiber and at least one additional optical fiber within an enclosing tube,
wherein the at least one additional optical fiber has another core diameter that is different from the core diameter, and
wherein the at least one additional optical fiber has an independently pre-formed taper relative to the optical fiber; and
splicing the optical fiber, at a taper waist of the enclosing tube, to an output fiber, to enable core light from the optical fiber to enter the output fiber,
wherein, at the taper waist, a diameter of a combined cladding of the optical fiber and at least one additional optical fiber is size-matched to a core diameter of an output core of the output fiber.

12. The method of claim 11, wherein forming the core to have the taper comprises:
removing material from the cladding of the optical fiber, in the section of the optical fiber, such that the diameter of the cladding increases from a first end of the section of the optical fiber to a second end of the section of the optical fiber; and
tapering the optical fiber, in the section of the optical fiber in which the material of the cladding is removed, to form the core having the taper.

13. The method of claim 12, wherein the diameter of the core having the taper decreases from the first end of the section of the optical fiber to the second end of the section of the optical fiber.

14. The method of claim 12, wherein the optical fiber is tapered using flame tapering.

15. The method of claim 11, wherein forming the core to have the taper comprises:
tapering the optical fiber, in the section of the optical fiber, to form the core having the taper; and
removing material from the cladding of the optical fiber, in the section of the optical fiber that is tapered.

16. The method of claim 11, wherein the section of the optical fiber includes a separate optical fiber, and
wherein forming the core to have the taper comprises:
removing material from a cladding of the separate optical fiber;
splicing the separate optical fiber to an optical fiber precursor to obtain the optical fiber; and
tapering the optical fiber, in the section of the optical fiber that includes the separate optical fiber, to form the core having the taper.

17. The method of claim 11, wherein the taper is an adiabatic taper.

18. The method of claim 11, wherein a first ratio of the diameter of the cladding of the optical fiber to the diameter of the core, at an input end of the optical fiber, is less than a second ratio of the diameter of the cladding of the optical fiber to the diameter of the core, at an output end of the optical fiber.

* * * * *